(No Model.)
J. H. BROOKMIRE.
COFFEE POLISHER.
No. 426,910. Patented Apr. 29, 1890.
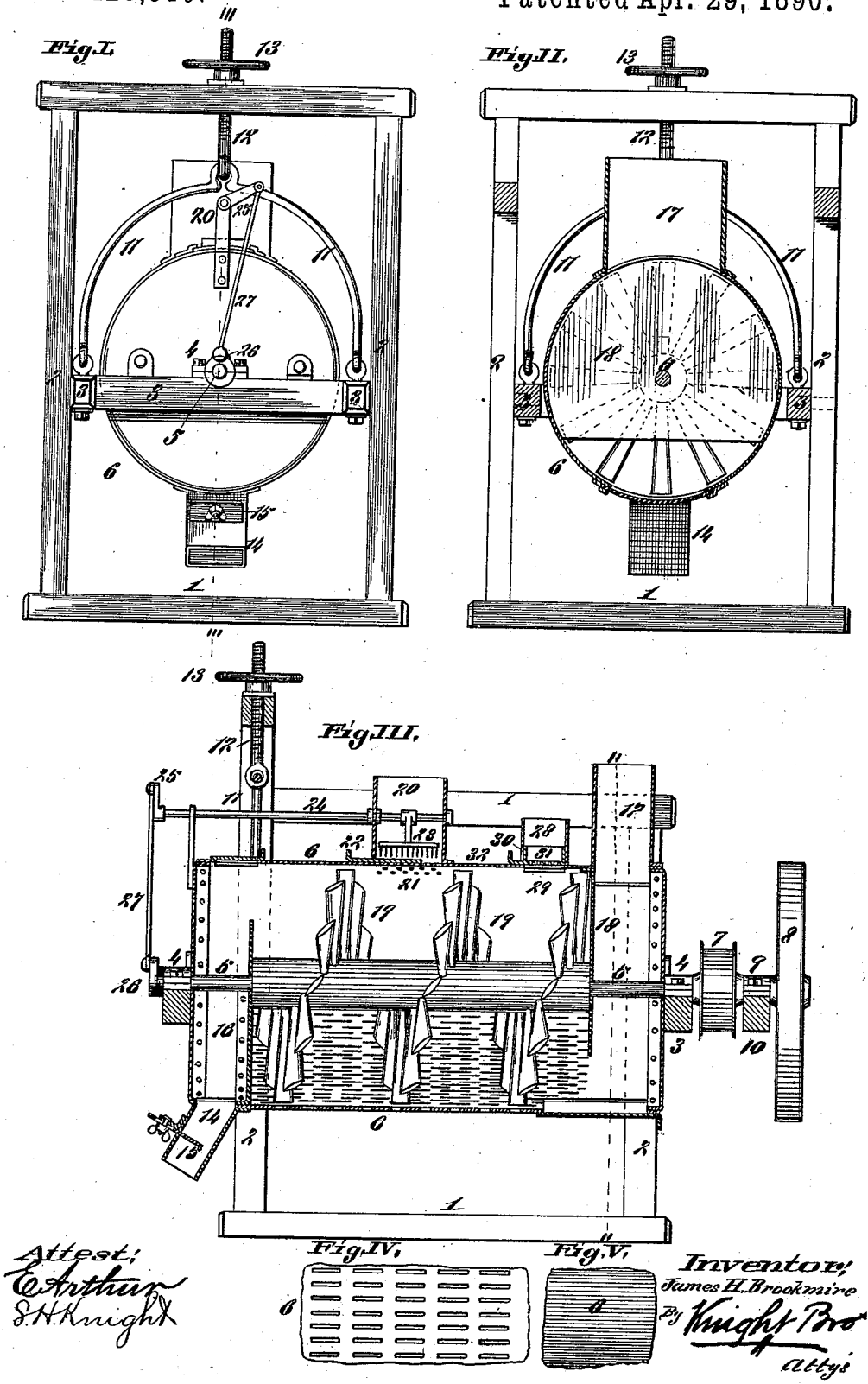

UNITED STATES PATENT OFFICE.

JAMES H. BROOKMIRE, OF ST. LOUIS, MISSOURI.

COFFEE-POLISHER.

SPECIFICATION forming part of Letters Patent No. 426,910, dated April 29, 1890.

Application filed January 14, 1890. Serial No. 336,908. (No model.)

*To all whom it may concern:*

Be it known that I, JAMES H. BROOKMIRE, of the city of St. Louis, in the State of Missouri, have invented a certain new and useful Improvement in Coffee Polishers and Cleaners, of which the following is a full, clear, and exact description, reference being had to the accompanying drawings, forming part of this specification.

My present invention relates to machines for polishing coffee and at the same time removing therefrom the fragments of shell and dust or other refuse; and it consists in certain features of improvement over a device of this kind shown and described in United States Letters Patent No. 192,224, granted to me June 19, 1877, as hereinafter more fully described, and particularly pointed out in the claims.

Figure I is an end elevation of my improved machine. Fig. II is a vertical transverse section taken on line II II, Fig. III. Fig. III is a vertical longitudinal section taken on line III III, Fig. I. Fig. IV is a detail view showing a piece of the bottom of the cylinder or drum. Fig. V is a similar view showing a modification.

Referring to the drawings, 1 represents a suitable supporting-frame, within the uprights 2 of which fits a second rectangular frame 3, to the ends of which boxes 4 are secured that form the journals for the ends of a shaft 5, that passes through the heads of a cylinder or drum 6, that fits within or is surrounded by the frame 3. One end of the shaft is extended to receive and carry a driving-pulley 7 and a fly-wheel 8. Between the pulley and fly-wheel is a journal-box 9, through which the shaft passes, and which is made fast to a supporting-strip 10. (See Fig. III.) This strip 10 supports this end of the shaft 5, cylinder 6, and frame 3, but does not interfere with the vertical movement of the other end of these parts, which are supported by a yoke 11, made fast at its lower ends to the frame 3, and connected at its upper end to a cross-piece of the frame 1 by means of a threaded rod 12, (see Fig. I,) which passes through the cross-piece, and is provided with a threaded hand-wheel 13 above the cross-piece. By moving the hand-wheel this end of the cylinder or drum may be adjusted to regulate the freedom of delivery of the machine. This end of the machine is provided with a delivery-spout 14, that may have a sliding gate or valve 15. (See Fig. III.)

16 represents a diaphragm within the cylinder and extending from the bottom of the cylinder near the spout 14 in an upward direction beyond the shaft 5. It is perforated to receive the shaft.

The coffee to be polished or scoured enters the cylinder or drum through a spout 17, and is conveyed to the bottom of the cylinder by a diaphragm 18, extending from the top of the cylinder on a line with the inner wall of the spout to near the bottom of the cylinder. (See Fig. III.) It is perforated to receive the shaft 5. Between the diaphragms 16 and 18 the shaft 5 is enlarged and is provided with a number of arms 19, arranged spirally around the shaft, and which polish the coffee and move it toward the delivery end of the machine as the shaft is turned.

By providing the diaphragm 16 the delivery of the machine is retarded to afford a better polishing of the coffee, and the delivery can be further regulated by the use of the screw-rod 12, as stated.

The bottom of the cylinder may be made imperforate, if desired, as shown in Fig. V, or it may be provided with long slots, as shown in Fig. IV. The function of the slots would be to permit any dust or broken shells from the coffee to escape, and such dust and shells will escape much more effectually through these long slots than they would through round perforations, and for this reason slots instead of round perforations are provided.

20 represents a hopper on the cylinder, in which the polishing material is placed and from which it escapes into the cylinder through perforations 21. (See Fig. III.) This hopper may be provided with a slide 22 to regulate the feed of the polishing material, and to prevent the material from clogging in the hopper a rake 23 is located within the hopper on a rock-shaft 24, connected by cranks 25 and 26 and a link 27 to the shaft 5. The crank 25 is made quite short compared to the length of the crank 26, so that while it revolves the crank 26 only oscillates, thus producing the rocking of the shaft 24, as stated.

28 represents an oil-box located on the cylinder or drum over a hole 29. One side of this box is provided with an opening 30 to admit a removable oil-cup 31, having a perforated bottom which permits the oil to pass therefrom onto the coffee in the cylinder.

The cup is provided with a horn 32, by which it may be withdrawn from and inserted into the box for the purpose of being cleaned.

I claim as my invention—

1. In a coffee polisher and cleaner, the combination of an outer frame, an inner frame adjustable at one end by means of a yoke 11, rod 12, and wheel 13, a slotted cylinder or drum located within said movable frame and supported thereby, a shaft passing through the cylinder or drum, a diaphragm 16, extending from the bottom of the cylinder or drum in an upward direction, a diaphragm 18, extending from the top of the cylinder or drum in a downward direction, a delivery-spout, a shaft passing through the cylinder and enlarged between the said diaphragms, arms arranged on the shaft between the diaphragms in a spiral form, a receiving-spout for the coffee, a hopper provided with a rake for holding the polishing material and beneath which the cylinder is perforated, a rock-shaft, crank, and link for moving the brush, an oil-box located over a perforation in the cylinder and provided with an opening, and a removable oil-cup having a perforated bottom and adapted to be applied to the oil-box through said opening, substantially as and for the purpose set forth.

2. In a coffee polisher and cleaner, the combination of a cylinder or drum having a receiving and discharge spout, a shaft provided with arms, and an oiling device consisting of a box located over a perforation in the cylinder, and an oil-cup having a perforated bottom and fitting within said box, substantially as and for the purpose set forth.

JAS. H. BROOKMIRE.

In presence of—
E. S. KNIGHT,
M. M. KINGSLAND.